United States Patent
Schröder et al.

(10) Patent No.: US 12,479,252 B2
(45) Date of Patent: Nov. 25, 2025

(54) STABILIZER ASSEMBLY WITH ACTUATOR FOR A TWO-TRACK VEHICLE

(71) Applicant: Muhr und Bender KG, Attendorn (DE)

(72) Inventors: Daniel Schröder, Olpe-Dahl (DE); Thomas Schrüllkamp, Olpe (DE); Andreas Gersmeier, Sundern (DE); Serge Vos, Munich (DE); Gerhard Zeller, Grafing (DE)

(73) Assignee: Muhr und Bender KG, Attendom (DE)

( * ) Notice: Subject to any disclaimer, the term of this patent is extended or adjusted under 35 U.S.C. 154(b) by 413 days.

(21) Appl. No.: 18/251,442

(22) PCT Filed: Nov. 2, 2021

(86) PCT No.: PCT/EP2021/080416
§ 371 (c)(1),
(2) Date: May 2, 2023

(87) PCT Pub. No.: WO2022/096469
PCT Pub. Date: May 12, 2022

(65) Prior Publication Data
US 2023/0415534 A1 Dec. 28, 2023

(30) Foreign Application Priority Data
Nov. 4, 2020 (DE) ..................... 10 2020 129 069.1

(51) Int. Cl.
*B60G 11/64* (2006.01)
*B60G 17/02* (2006.01)
*B60G 21/055* (2006.01)

(52) U.S. Cl.
CPC ............ *B60G 11/64* (2013.01); *B60G 17/025* (2013.01); *B60G 21/0558* (2013.01);
(Continued)

(58) Field of Classification Search
CPC .. B60G 11/64; B60G 17/025; B60G 21/0558; B60G 2202/135; B60G 2202/154; B60G 2202/441
See application file for complete search history.

(56) References Cited

U.S. PATENT DOCUMENTS 7,287,759 B2 10/2007 Uchiyama et al.
12,179,533 B1 * 12/2024 Kim .................. F16F 1/145
(Continued)

FOREIGN PATENT DOCUMENTS

DE 102005043176 A1 5/2007
DE 102007028852 A1 12/2008
(Continued)

OTHER PUBLICATIONS

International Search Report and Written Opinion for PCT/EP2021/080416 mailed May 6, 2022 (18 pages; with English translation).

*Primary Examiner* — Toan C To
(74) *Attorney, Agent, or Firm* — Brooks Kushman P.C.

(57) ABSTRACT

A stabilizer assembly for a two-track vehicle comprises: a first and a second stabilizer section; a spring element between the stabilizer sections; a hydraulic actuator having an actuator outer part and an actuator inner part, each of which is non-rotatably connected to one of the stabilizer sections, and an intermediate element connected to the actuator outer part and actuator inner part respectively via outer and inner engagement means, wherein one of the engagement means has a pitch component in the axial direction and the other runs parallel to the longitudinal axis, so that a relative rotational movement of the actuator parts is converted into an axial movement of the intermediate element, wherein the intermediate element pressurises a first and second hydraulic chamber respectively; the hydraulic
(Continued)

chambers being hydraulically connected to one another with interposition of a control element.

15 Claims, 3 Drawing Sheets

(52) U.S. Cl.
CPC .. *B60G 2202/135* (2013.01); *B60G 2202/154* (2013.01); *B60G 2202/441* (2013.01)

(56) References Cited

U.S. PATENT DOCUMENTS

| | | | | |
|---|---|---|---|---|
| 2009/0112400 | A1* | 4/2009 | Urababa | B60G 21/0555 701/38 |
| 2009/0224493 | A1* | 9/2009 | Buma | B60G 17/0162 280/5.511 |
| 2010/0253019 | A1* | 10/2010 | Ogawa | B60G 21/0553 280/5.511 |
| 2020/0070617 | A1* | 3/2020 | Lim | B60G 21/0553 |
| 2020/0198435 | A1* | 6/2020 | Dhanraj | B60G 21/073 |
| 2020/0376919 | A1* | 12/2020 | Lim | B60G 21/055 |
| 2021/0008950 | A1* | 1/2021 | Kuwayama | B60G 21/0556 |
| 2021/0270343 | A1* | 9/2021 | Battlogg | F16F 9/145 |
| 2023/0060076 | A1* | 2/2023 | Kraus | B60G 21/0556 |
| 2024/0262155 | A1* | 8/2024 | Lee | B60G 21/0556 |

FOREIGN PATENT DOCUMENTS

| | | |
|---|---|---|
| DE | 102008030361 A1 | 12/2009 |
| DE | 102009029802 A1 | 12/2010 |
| DE | 202015101123 U1 | 3/2015 |
| DE | 102006057891 B4 | 6/2015 |
| DE | 102014018732 A1 | 6/2015 |
| DE | 102017118044 A1 | 2/2018 |
| DE | 102017215526 B3 | 3/2019 |
| DE | 102019111488 A1 | 11/2020 |
| EP | 0428439 B1 | 4/1992 |
| GB | 2318771 A | 5/1998 |
| JP | S63-57309 A | 11/1988 |
| JP | 2004122944 A | 4/2004 |
| JP | 2007176231 A | 7/2007 |
| JP | 2008068859 B2 | 3/2008 |
| WO | 2020225029 A1 | 11/2020 |

* cited by examiner

STABILIZER ASSEMBLY WITH ACTUATOR FOR A TWO-TRACK VEHICLE

CROSS-REFERENCE TO RELATED APPLICATIONS

This application is a national stage of, and claims priority to, Patent Cooperation Treaty Application No. PCT/EP/2021/080416, filed on Nov. 2, 2021, which application claims priority to German Application No. DE102020129069.1, filed on Nov. 4, 2020, which applications are hereby incorporated herein by reference in their entireties.

TECHNICAL FIELD

The disclosure relates to a stabilizer assembly with an actuator for a two-track vehicle.

A stabilizer assembly is used to counteract vehicle roll and thus contribute to improving the vehicle's driving dynamics and/or road holding. The ends of a stabilizer are each connected to a wheel suspension of a vehicle axle. Between the two ends, the anti-roll bar is attached to the vehicle body. Passive, semi-active and active stabilizer assemblies are known.

BACKGROUND

A roll control actuator for a torsion bar is known from GB 2 318 771 A, comprising a cylindrical housing connectable to a first part of the torsion bar and a rod rotatable in the housing and connectable to a second part of the torsion bar. A cylindrical sleeve is arranged in the housing and connected to it in a rotationally fixed manner, which has circumferential recesses in an inner surface. The rod has an external thread on its outer surface. Balls engage internally in the external thread of the rod and externally in the recesses of the sleeve. Control means in the form of two fluid chambers interact with the housing and the rod, the fluid chambers being located on opposite sides of a rib of the sleeve. The two fluid chambers are connected to a pump which can supply hydraulic fluid to the chambers.

A stabilizer assembly for a two-track vehicle is known from WO 2020/225029 A1, which comprises an actuator with two working chambers. The actuator comprises a transmission unit which is configured in such a way that a rotational movement of the stabilizer halves are convertible into a translational movement of an intermediate element arranged between the working chambers.

A semi-active stabilizer arrangement for a motor vehicle is known from DE 10 2009 029 802 A1. The stabilizer arrangement comprises a split stabilizer whose first stabilizer section is coupled to a second stabilizer section via a hydraulic actuator. The first stabilizer section is non-rotatably connected to a housing of the actuator, and the second stabilizer section is non-rotatably connected to a shaft projecting into the housing. A displaceable piston is arranged in the housing, from which two hydraulically interconnected chambers can be pressurised. The chambers are directly connected to each other with incorporation of a control element.

A roll stabilizer system with a two-part torsion shaft and a torsion motor for adjustment is known from DE 10 2008 030 361 A1. A first shaft part is connected in a rotationally fixed manner to a sleeve-shaped housing into which the second shaft part extends. A piston is axially displaceably received in the housing, the inner circumferential surface of which has a helical contour, and is guided on the second shaft part in a rotationally fixed manner. The piston has an eccentric through-opening through which the second shaft part extends.

A semi-active stabilizer assembly for a vehicle chassis is known from DE 20 2015 101 123 U1. The stabilizer assembly comprises two separate stabilizer parts which can be rotated relative to each other. An actuator is provided between the two stabilizer parts, which connects their free end regions with each other. The actuator comprises electromagnetically interacting coil elements.

A stabilizer arrangement is known from DE 10 2017 118 044 A1, with a first stabilizer bar, a second stabilizer bar and a rotational damper arranged therebetween. The rotational damper can implement two operating modes depending on the driving state of the vehicle.

SUMMARY

The present disclosure describes a stabilizer assembly with actuator, which has a simple design and requires a small installation space.

A stabilizer assembly for a two-track vehicle comprises: a first stabilizer section; a second stabilizer section; a spring element arranged between the first stabilizer section and the second stabilizer section; a hydraulic actuator including an actuator outer part connected to one of said first and second stabilizer sections in a rotationally fixed manner and an actuator inner part connected to the other of said first and second stabilizer sections in a rotationally fixed manner, and an intermediate element connected to said actuator outer part via outer engagement means and connected to said actuator inner part via inner engagement means, wherein one of said outer and inner engagement means has a pitch component in the axial direction, and the other one of said outer and inner engagement means is parallel to the longitudinal axis, so that relative rotational movement between the actuator outer part and the actuator inner part is converted into axial movement of the intermediate element, with said intermediate element pressurising a first hydraulic chamber when moving in a first direction and pressurising a second hydraulic chamber when moving in the opposite second direction; wherein the first hydraulic chamber and the second hydraulic chamber are hydraulically connected to each other with a control element being interposed therebetween.

An advantage of the stabilizer assembly is that it has a short axial length due to the outer engagement means on the actuator outer part and the inner engagement means on the actuator inner part. For example, the outer and inner engagement means can be arranged to at least partially overlap each other axially. This allows simpler axis integration depending on the available installation space.

The hydraulic actuator on the one hand and the spring element on the other hand are arranged functionally parallel between the first and second stabilizer sections. In this way, the stabilizer assembly can be operated with at least two different spring characteristics. The two stabilizer sections, which can also be referred to as stabilizer halves, are coupled to each other by the spring element so as to be rotatable against each other, allowing the stabilizer to be operated with a first spring characteristic. Furthermore, the two stabilizer sections are coupled and/or can be coupled to each other hydraulically by the hydraulic actuator so as to be rotatable against each other, allowing the stabilizer to be operated with a second spring characteristic.

According to an embodiment, a first hydraulic connector for the first hydraulic chamber and a second hydraulic connector for the second hydraulic chamber are both connected to the actuator outer part. In this way, both connectors and also the hydraulic lines connected thereto rotate together with the actuator outer part. This allows the hydraulic lines between the first and second connectors and the control unit to be formed as rigid lines, which are robust and have a long service life. Furthermore, there is a constructive flexibility regarding the design and arrangement of the control element. For example, the control element can be arranged at least partially with axial overlap to the actuator. In this case, a housing of the control element can be firmly connected to the outer part of the actuator, for example by a material connection such as bonding or welding, or form-fitting connection such as screws. Alternatively, the control element can be arranged at least partially axially offset from the actuator. In this case, the control housing can be firmly connected at least indirectly to the actuator outer part, for example on the stabilizer section that is connected to the actuator outer part in a rotationally fixed manner.

According to an embodiment, the actuator outer part is provided as a housing part and the actuator inner part as a hollow shaft. One of the outer actuator part and the inner actuator part is connected to the first stabilizer section in a rotationally fixed manner, while the other of said parts is connected to the second stabilizer section in a rotationally fixed manner. When the vehicle rolls, the two stabilizer sections and thus the intermediate spring element and, respectively, the two actuator parts are rotated relative to each other.

The spring element arranged between the stabilizer sections is a torsion spring. The torsion spring can extend axially through the actuator inner part formed as a hollow shaft. A first end portion of the spring element is non-rotatably connected to the first stabilizer section, and a second end section of the spring element is non-rotatably connected to the second stabilizer section.

The intermediate element is inserted between the actuator outer part and the actuator inner part in the manner of a piston so that it can move axially, and can therefore also be referred to as a piston element. Together with the outer engagement means on the actuator outer part and the inner engagement means on the actuator inner part, the intermediate or piston element forms a rotation-translation converter. A relative rotational movement between the actuator outer part and the actuator inner part is converted into a translational movement of the piston element, so that the respective hydraulic chamber is pressurised depending on the direction of rotation.

The assignment of the engagement means with or without axial pitch component to the actuator outer part or actuator inner part is basically freely selectable. According to a first possibility, the engagement means with an axial pitch component are assigned to the actuator outer part, and the engagement means without an axial pitch component are accordingly assigned to the actuator inner part. In principle, however, the kinematic reversal is also possible. According to a more specific embodiment, the engagement means with an axial pitch component can be provided in the form of helical toothing, wherein an outer helical toothing is formed at the intermediate element which engages a corresponding counter-part inner helical toothing at the actuator outer part in a screw-like rotatable manner. The engagement means without an axial pitch component can be formed as splined toothing, wherein an inner hollow shaft toothing is formed at the intermediate element, which engages a corresponding shaft toothing of the actuator inner part in a rotationally fixed and axially movable manner. The axial extension of the engagement means running parallel to the longitudinal axis can be shorter than an axial length of the intermediate element, e.g., shorter than 0.5 times the axial length of the intermediate element. In this way, axial moveability of the intermediate element relative to the actuator inner part is possible.

According to an embodiment, the intermediate element of the actuator has a first end portion associated with the first hydraulic chamber and a second end portion associated with the second hydraulic chamber. The two hydraulic chambers are hydraulically sealed from each other. For this purpose, one of the two end portions can be sealed relative to the actuator outer part by an outer seal and can be configured seal-free relative to the actuator inner part, while the other of the two end portions is sealed relative to the actuator inner part by an inner seal and is seal-free relative to the actuator outer part. By this design, only two seals are required to seal the piston element against the two hydraulic chambers and the two hydraulic chambers against each other, respectively, which has a favourable effect on the manufacturing and assembly costs.

The control element can be configured according to the requirements of the stabilizer assembly, wherein the first and second hydraulic chambers can be hydraulically connected to each other in at least one condition of the control element. By configuring the control element accordingly, the damping of the stabilizer arrangement can be adjusted according to the requirements depending on the speed of the forces and/or moments introduced, which in turn depend on the frequency of movement of the vehicle. The hydraulic actuator can be designed in such a way that a low damping force is achieved at higher frequencies of, for example, greater than 2 Hz, e.g., greater than 5 Hz, and a greater damping force is generated at lower frequencies of, for example, less than 5 Hz, e.g., less than 2 Hz. A semi-active and/or adaptive implementation is possible, in which the damping behaviour is adjusted automatically, i.e., purely physically or hydraulically, without external hydraulic or electrical (pneumatic, magnetic, etc.) control. Alternatively, an active implementation with separate external control is possible.

For example, according to a first possibility, the control element may comprise a frequency-selective valve that has a variable damping force depending on an oscillation frequency and/or the oscillation amplitude of the stabilizer assembly. In this case, the frequency-selective valve can be designed in such a way that it has a lower damping force at higher excitation frequencies and/or vibration amplitudes than at lower excitation frequencies and/or vibration amplitudes. This can be achieved by selecting the bore sizes in the valve accordingly to conduct the desired volume flow of the hydraulic fluid. Small drain holes and/or orifices in the valve can allow hydraulic fluid to pass through during slow excitation, whereas a hydraulic flow is prevented or dampened during fast excitation.

According to a second possibility, the control element may comprise a frequency-selective valve and at least one controllable switching valve. The frequency-selective valve may be configured as in the first possibility. The at least one switching valve is arranged in the hydraulic connection between the two hydraulic chambers. In the closed position, the hydraulic connection between the chambers is interrupted so that the piston element of the actuator is prevented from moving axially. In this switching position, the actuator outer part and the actuator inner part are locked to each other in a torsionally fixed manner. This results in a comparatively hard spring characteristic. In the open position of the switching valve, the two chambers communicate hydraulically with each other so that the actuator piston element can move axially when the two stabilizer sections rotate relative to each other. In this switching position, damping takes place by means of the frequency-selective valve variably depending on the vibration frequency of the stabilizer assembly.

According to a third possibility, the control element may comprise a controllable switching valve, as in the second possibility, but dispensing with a frequency-selective valve. In the closed position of the switching valve, the two chambers are hydraulically separated from each other so that the actuator outer part and the actuator inner part are locked to each other in a torsionally rigid manner. This results in a comparatively hard spring characteristic. In the open position of the switching valve, the two chambers communicate hydraulically with each other so that the actuator piston element can move axially when the two stabilizer sections rotate relative to each other. This results in a comparatively soft spring characteristic via the spring element connected to the stabilizer sections.

BRIEF SUMMARY OF THE DRAWINGS

Examples of embodiments are explained below with reference to the figures in the drawings. Herein.

DESCRIPTION

Figure 1:
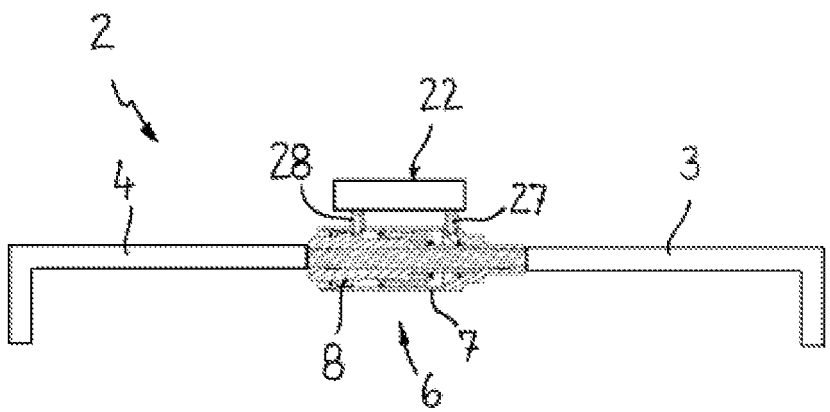
FIG. 1 shows a stabilizer assembly according to the invention in a first embodiment.
Figure 2:
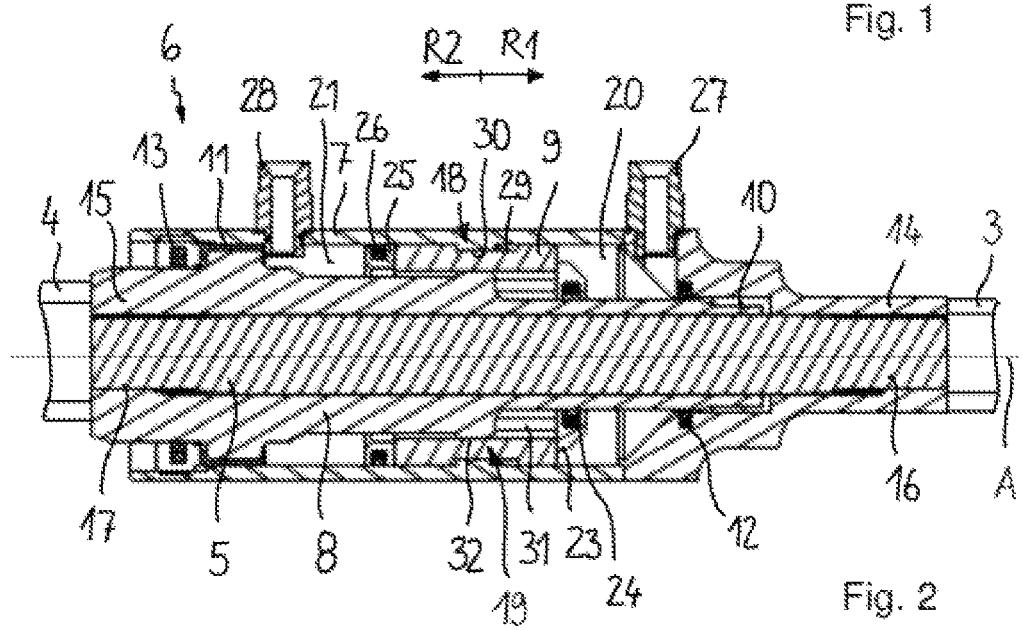
FIG. 2 shows the actuator of the stabilizer assembly from FIG. 1 in detail in longitudinal section.
Figure 3:
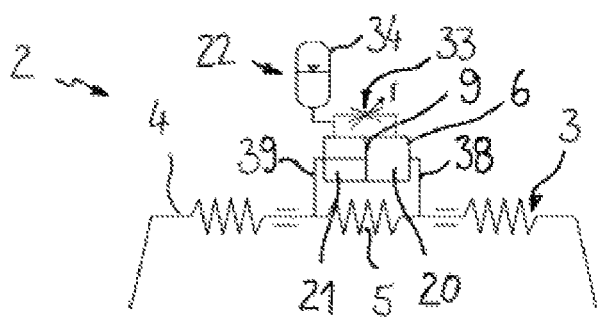
FIG. 3 shows the stabilizer assembly from FIG. 1 schematically.

FIGS. 1 to 3, which are described together below, show a stabilizer assembly 2 in a first embodiment.

The stabilizer assembly 2 comprises a first stabilizer section 3 and a second stabilizer section 4, which are coupled to one another via a spring element 5 so as to be rotatable relative to each other, with the stabilizer being operable with a first spring characteristic. The stabilizer assembly 2 further comprises a hydraulic actuator 6, via which the two stabilizer sections 3, 4 can be hydraulically coupled to each other in a functionally parallel arrangement to the spring element 5, wherein the stabilizer can be operated with a second spring characteristic.

The actuator 6 comprises an actuator outer part 7, which is non-rotatably connected to the first stabilizer section 3, an actuator inner part 8, which is non-rotatably connected to the second stabilizer section 4, and an intermediate element 9 arranged radially between the two actuator parts 7, 8. The actuator outer part 7 is formed as a housing part, and the actuator inner part 8 as a hollow shaft, without being restricted thereto. The actuator inner part 8 is mounted by suitable bearing means 10, 11 so as to be rotatable about the longitudinal axis A in the actuator outer part 7 and is sealed with respect thereto by suitable sealing elements 12, 13. The actuator outer part 7 comprises a connecting portion 14 which is firmly connected to the first stabilizer section 3. At the opposite end, the actuator inner part 8, formed as a hollow shaft, has a connecting portion 15 to which the second stabilizer section 4 is firmly connected. The spring element 5 is configured as a torsion bar spring, wherein a first spring end 16 is connected in a rotationally fixed manner to the connecting portion 14 of the actuator outer part 7 via a plug-in connection, and a second spring end 17 is connected in a rotationally fixed manner to the connecting portion 15 of the actuator inner part 8 via a plug-in connection. When the vehicle rolls, the two stabilizer sections 3, 4 and, respectively, the actuator parts 7, 8 connected thereto are rotated relative to each other so that the interposed spring element 5 is twisted and damps the rolling motion with a first spring rate.

A second spring rate results from the actuator 6, the intermediate element 9 of which is arranged between the actuator outer part 7 and the actuator inner part 8 in an axially movable manner like a piston. The intermediate element 9 is part of a rotation-translation converter, which is configured in such a way that a rotational movement of the two actuator parts 7, 8 relative to each other is or can be converted into an axial movement of the intermediate element 9. For this purpose, outer engagement means 18 are provided, with which the intermediate element 9 engages the actuator outer part 7, in a form-fitting manner, as well as inner engagement means 19, with which the intermediate element 9 engages the actuator inner part 8, in a form-fitting manner. In the present embodiment, the outer engagement means 18 have an incline component in the axial direction, whereas the inner engagement means 19 are axially incline-free with respect to the longitudinal axis A, respectively run parallel thereto. It is understood that a reverse assignment of the engagement means with and without a gradient component to the outer and inner actuator part is also possible.

The engagement means 18 with an axial pitch component are provided in the form of a helical arrangement, in which an outer helical toothing 29 of the intermediate element 9 engages in a counter-part inner helical toothing 30 of the actuator outer part 7 in such a way that the intermediate element and the actuator outer part can be rotated against each other in a helical manner. The engagement means 19 without an axial pitch component are configured in the form of a splined toothing, wherein an inner hollow shaft toothing 31 of the intermediate element 9 engages a counter-part shaft toothing 32 of the actuator inner part 8 in a rotationally fixed and axially movable manner. For sufficient axial moveability of the intermediate element 9 relative to the actuator inner part 8, the effective axial length of the axis-parallel engagement means 19 is shorter than the axial length of the intermediate element 9, e.g., shorter than 0.5 times the axial length of the intermediate element.

When moving the intermediate element 9 in a first axial direction R1, a first hydraulic chamber 20 is pressurised. When moving in the opposite second direction R2, a second hydraulic chamber 21 is pressurised, which is arranged on the opposite side of the piston element. The two hydraulic chambers 20, 21 are hydraulically sealed against each other by the piston element and hydraulically connected to each other with interposition of a control element 22. This includes the possibility that the two hydraulic chambers 20, 21 are hydraulically connectable to each other via the control element 22, i.e., the hydraulic chambers are connected to each other in at least one condition of the control element 22.

For sealing the hydraulic chambers 20, 21, an inner seal 24 is provided at a first end portion 23 of the intermediate element 9, which seals the first hydraulic chamber 20 to the actuator inner part 8, with the first end portion 23 being seal-free to the actuator outer part 7. An outer seal 26 is provided at the second end portion 25 of the intermediate element 9, which seals the second hydraulic chamber 21 to the actuator outer part 7, with the second end section 25 being seal-free to the actuator inner part 8. Thus, only two seals 24, 26 are required to seal the intermediate element 9 from the two hydraulic chambers 20, 21. The end portions 23, 25 can be provided as seal carriers which are firmly connected to the intermediate element 9, for example by means of welding.

A first hydraulic connector 27 to the first hydraulic chamber 20 and a second hydraulic connector 28 to the second hydraulic chamber 21 are provided on the actuator outer part 7. The connectors 27, 28 are hydraulically connected to the control element 22 via hydraulic lines 38, 39, which can be provided as rigid or flexible lines.

The control element 22 can be configured according to the requirements of the stabilizer assembly 2. By designing the control element 22 accordingly, the damping of the stabilizer assembly 2 can be adjusted as required depending on the speed of the forces and/or moments introduced, which in turn depend on the frequency of movement of the vehicle. Preferably, the hydraulic actuator 6 is designed in such a way that a low damping force is achieved at higher frequencies of, for example, greater than 2 Hz, e.g., greater than 5 Hz, and a greater damping force is generated at lower frequencies of, for example, less than 5 Hz, e.g., less than 2 Hz.

Various functional examples of the actuator 6 and, respectively, control element 22 are explained below with reference to FIGS. 3 to 5. It will be understood that the stabilizer assembly shown in FIG. 1 can be provided with any of the actuators or control elements described below.

In the example shown in FIG. 3, the actuator 6 with control element 22 is configured as a semi-active system. For this purpose, the control element 22 comprises a damping unit 33, which is hydraulically connected to the first and second hydraulic chambers 20, 21, and a pressure accumulator 34. In the present case, the damping unit 33 is configured in the form of a frequency-selective valve, which enables a variable damping force depending on an oscillation frequency and/or oscillation amplitude of the stabilizer assembly 2. The frequency-selective valve is designed in such a way that it has a lower damping force at higher excitation frequencies and/or vibration amplitudes, than at lower excitation frequencies and/or vibration amplitudes. The pressure accumulator 34 serves to compensate for temperature changes and can be integrated into the control element or connected to it as a separate element. An external control or circuit is not provided in this implementation.

Figure 4:
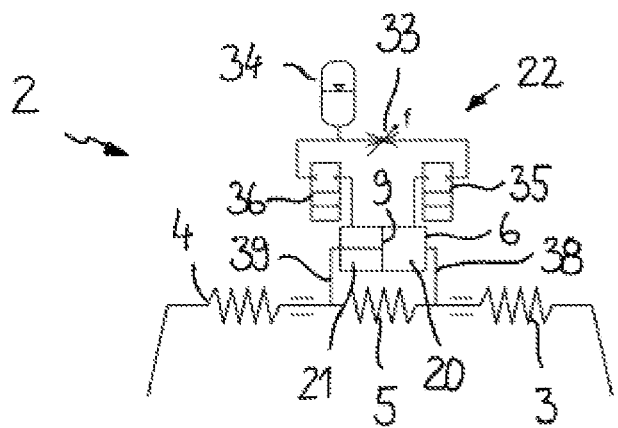
FIG. 4 schematically shows a stabilizer assembly in a second embodiment.

FIG. 4 shows a second embodiment of the actuator 6, respectively the control unit 22, which is configured as an active system. This design largely corresponds to the design shown in FIG. 3, the description of which is referred to here in order to avoid repetition. The same details are marked with the same reference signs. In addition to the above system, two externally controllable switching valves 35, 36 are provided in this embodiment according to FIG. 4, which are arranged between the hydraulic chambers 20, 21 and the connectors of the frequency-selective valve. In the closed position of the switching valves 35, 36, which is shown in FIG. 4, the hydraulic connection between the chambers 20, 21 is interrupted so that the piston element 9 of the actuator 6 is prevented from moving axially. In this switching position, the actuator outer part 7 and the actuator inner part 8 are locked to each other in a torsionally rigid manner. This results in a comparatively hard spring behavior, bypassing the spring element 5. In the open position of the switching valves 35, 36, the two chambers 20, 21 communicate hydraulically with each other, so that the piston element 9 can move axially when the two stabilizer sections 3, 4 rotate relative to each other. Damping takes place in this switching position by means of the frequency-selective valve 33 variably depending on the vibration frequency of the stabilizer assembly. The frequency-selective valve 33 can be configured as in the embodiment according to FIG. 3.

Figure 5:
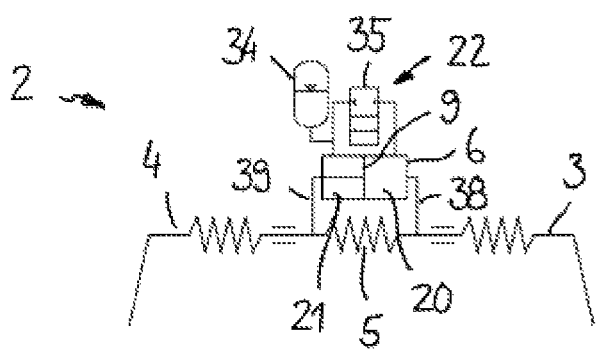
FIG. 5 schematically shows a stabilizer assembly in a third embodiment.

FIG. 5 shows a third embodiment of the actuator 6, respectively control unit 22, which is provided as an active system. This example is characterized in that only a controllable switching valve 35 is provided, but no frequency-selective valve. The switching function is as described in FIG. 4. In the closed position of the switching valve 35, the two chambers 20, 21 are hydraulically separated from each other. In the open position of the switching valve 35, the two chambers 20, 21 communicate hydraulically with each other so that a relative rotation of the two stabilizer sections 3, 4 to each other is possible and the piston element 9 can be moved axially accordingly.

The design of the actuator 6 results in flexibility with regard to the configuration and arrangement of the control element 22. Various examples for the arrangement of the control element 22 are explained below with reference to FIGS. 6 to 9.

Figure 6:
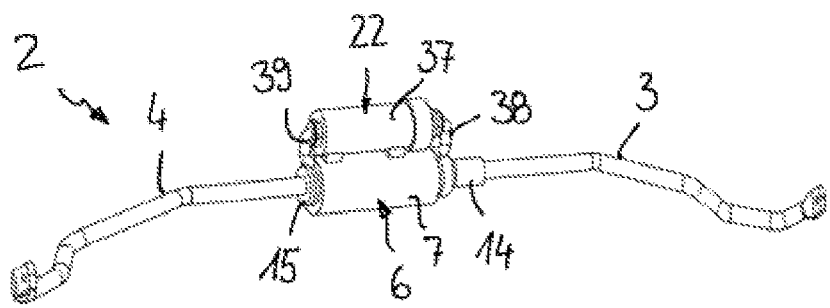
FIG. 6 shows a stabilizer assembly in a further embodiment with modified connection of the control unit.

In the embodiment shown in FIG. 6, the control element 22 is arranged with axial overlap to the actuator 6. The housing 37 of the control element 22 is firmly connected to the actuator outer part 7, for example by gluing, welding or a screw connection. The connecting lines 38, 39 and/or connectors 27, 28 open into axial end portions of the actuator 6.

Figure 7:
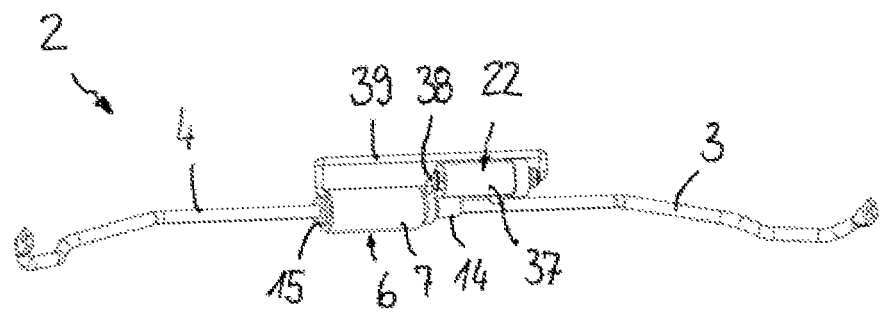
FIG. 7 shows a stabilizer assembly in a further embodiment with a modified arrangement of the control unit.

In the example shown in FIG. 7, the control element is arranged axially offset from the actuator 6. In this case, the control housing 37 is firmly connected to a stabilizer section 3 and is seated on it. The lines 38, 39 can be configured in such a way that they have a low rotational moveability in order to compensate for relative twisting between the stabilizer sections 3, 4.

Figure 8:
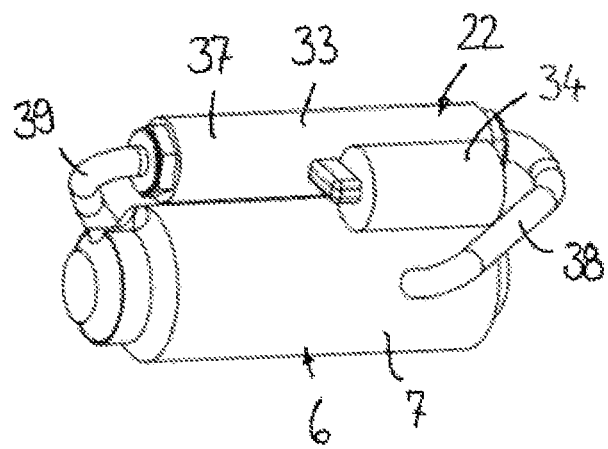
FIG. 8 shows an actuator assembly in a modified implementation for a stabilizer assembly.

The embodiment shown in FIG. 8 is characterized in that the pressure accumulator 34 of the control element 22 is provided as a separate element and is connected to the damping element 33. Furthermore, the control element 22 and the pressure accumulator 34 are arranged with axial overlap to the actuator 6. The housing 37 of the control element 22 is firmly connected to the actuator housing 7. The connecting lines 38, 39, and connectors 27, 28 respectively connect to a jacket portion of the actuator housing.

Figure 9:
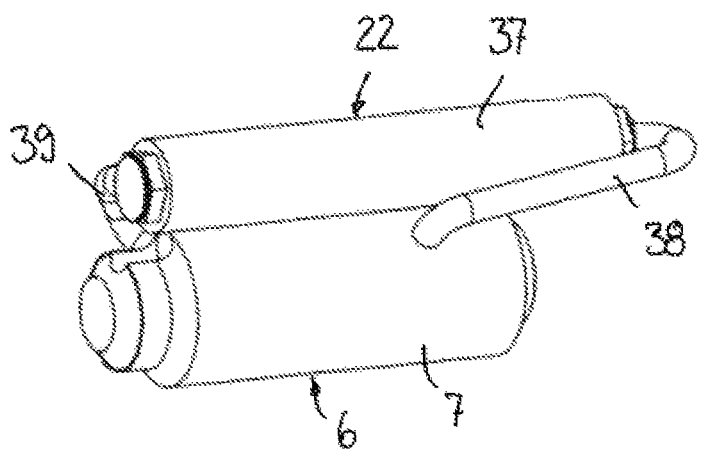
FIG. 9 shows an actuator assembly in a modified implementation for a stabilizer assembly.

In the example shown in FIG. 9, the control element 22 comprises the damping unit 33 and the pressure accumulator 34 as a single unit. The control element 22 is longer than the actuator 6 and projects beyond it in the axial direction on one side. The connecting lines 38, 39, and respectively connectors 27, 28, connect to a jacket section of the actuator housing.

LIST OF REFERENCE SIGNS 2 stabilizer assembly
3 first stabilizer section
4 second stabilizer section
5 spring element 6 actuator
7 actuator outer part
8 actuator inner part
9 intermediate element
10 bearing means
11 bearing means
12 sealing element
13 sealing element
14 connecting portion
15 connecting portion
16 first spring end
17 second spring end
18 outer engagement means
19 inner engagement means
20 first hydraulic chamber
21 second hydraulic chamber
22 control element
23 first end portion
24 inner seal
25 second end portion
26 outer seal
27 first connector
28 second connector
29 external helical toothing
30 inner helical toothing
31 hollow shaft toothing
32 shaft toothing
33 damping unit
34 pressure accumulator
35 switching valve
36 switching valve
37 control housing
38 line
39 line
A axis
R1 first direction
R2 second direction

The invention claimed is:

1. A stabilizer assembly for a two-track vehicle comprising:
    a first stabilizer section;
    a second stabilizer section;
    a hydraulic actuator having an actuator outer part which is connected to one of the first and second stabilizer sections in a rotationally fixed manner, and having an actuator inner part which is connected to the other one of the first and second stabilizer sections in a rotationally fixed manner, and an intermediate element connected to the actuator outer part via outer engagement means and connected to the actuator inner part via inner engagement means, wherein one of the outer and inner engagement means has a pitch component in the axial direction and the other one of the outer and inner engagement means extends parallel to the longitudinal axis so that a relative rotational movement between the actuator outer part and the actuator inner part is converted into an axial movement of the intermediate element, wherein the intermediate element pressurises a first hydraulic chamber when moving in a first direction and pressurises a second hydraulic chamber when moving in the opposite second direction;
    wherein a spring element is arranged between the first stabilizer section and the second stabilizer section; and
    wherein the first hydraulic chamber and the second hydraulic chamber are hydraulically connected to each other with a control element being interposed therebetween.

2. The stabilizer assembly according to claim 1,
    wherein both of a first hydraulic connector for the first hydraulic chamber and a second hydraulic connector for the second hydraulic chamber are connected to the actuator outer part.

3. The stabilizer assembly according to claim 2,
    wherein a first connecting line between the first hydraulic connector and the control element, and a second connecting line between the second hydraulic connector and the control element, are both configured rigid or flexible.

4. The stabilizer assembly according to claim 1,
    wherein the actuator outer part is configured as a housing part, and that the actuator inner part is configured as a hollow shaft,
    wherein one of the actuator outer part and the actuator inner part is connected to the first stabilizer section in a rotationally fixed manner, and
    the other one of the actuator outer part and the actuator inner part is connected to the second stabilizer section in a rotationally fixed manner.

5. The stabilizer assembly according to claim 4,
    wherein the spring element is configured as a torsion spring which is arranged functionally parallel to the actuator between the first stabilizer section and the second stabilizer section, wherein the torsion spring extends axially through the actuator inner part designed as hollow shaft, and includes a first end portion connected in a rotationally fixed manner to the first stabilizer section and a second end portion connected in a rotationally fixed manner to the second stabilizer section.

6. The stabilizer assembly according to claim 1,
    wherein the intermediate element has a first end portion associated with the first hydraulic chamber and a second end portion associated with the second hydraulic chamber,
    wherein one of the first end portion and the second end portion of the intermediate element is sealed relative to the actuator outer part by an outer seal and is seal-free relative to the actuator inner part, and
    the other one of the first end portion and the second end portion of the intermediate element is sealed relative to the actuator inner part by an inner seal and is seal-free relative to the actuator outer part.

7. The stabilizer assembly according to claim 1,
    wherein the outer engagement means run at an angle to the longitudinal axis and the inner engagement means run parallel to the longitudinal axis, or,
    wherein the outer engagement means run parallel to the longitudinal axis and the inner engagement means run at an angle to the longitudinal axis.

8. The stabilizer assembly according to claim 1,
    wherein the outer engagement means of the intermediate element are configured in the form of helical toothing which engages in a helically rotatable manner with a respective counter-toothing of the actuator outer part.

9. The stabilizer assembly according to claim 1,
    wherein the inner engagement means of the intermediate element are configured as splines which engage corresponding shaft splines of the actuator inner part in a rotationally fixed and axially displaceable manner.

10. The stabilizer assembly according to claim 1,
    wherein the axial extension of the engagement means running parallel to the longitudinal axis is shorter than an axial length of the intermediate element.

11. The stabilizer assembly according to claim 1,
wherein the control element includes a damping unit and a pressure accumulator, with the damping unit being configured as a semi-active or active unit.

12. The stabilizer assembly according to claim 11,
wherein the damping unit comprises a frequency-selective valve which has a variable damping force as a function of an oscillation frequency of the stabilizer assembly,
wherein the frequency-selective valve is configured to have a damping force that at high excitation frequencies of more than 5 Hz is lower than at low excitation frequencies of less than 2 Hz.

13. The stabilizer assembly according to claim 1,
wherein the control element is arranged at least partially with axial overlap to the actuator and has a control housing which is firmly connected to the actuator outer part.

14. The stabilizer assembly according to claim 1,
wherein the control element is arranged at least partially axially offset with respect to the actuator, the control housing being firmly connected at least indirectly to the actuator outer part.

15. The stabilizer assembly according to claim 14,
wherein the control housing is connected to the stabilizer section connected to the actuator outer part via a connecting element, the connecting element being able to absorb angular differences.

* * * * *